United States Patent
Davidovici

(10) Patent No.: US 7,929,824 B2
(45) Date of Patent: Apr. 19, 2011

(54) OPTICAL IMAGE RECORDING AND IMAGE EVALUATION SYSTEM

(75) Inventor: Dan Davidovici, Pfaffenhofen a.d. Ilm (DE)

(73) Assignee: Carl Zeiss MicroImaging GmbH, Jena (DE)

(*) Notice: Subject to any disclaimer, the term of this patent is extended or adjusted under 35 U.S.C. 154(b) by 1090 days.

(21) Appl. No.: 10/938,654

(22) Filed: Sep. 13, 2004

(65) Prior Publication Data

US 2005/0030407 A1 Feb. 10, 2005

Related U.S. Application Data

(63) Continuation of application No. PCT/EP03/01702, filed on Feb. 20, 2003.

(30) Foreign Application Priority Data

Mar. 12, 2002 (DE) .................. 102 10 831

(51) Int. Cl.
    *H04N 9/80* (2006.01)
(52) U.S. Cl. ............... 386/242; 386/223; 386/224
(58) Field of Classification Search ............... None
    See application file for complete search history.

(56) References Cited

U.S. PATENT DOCUMENTS

| | | | |
|---|---|---|---|
| 3,908,082 A | 9/1975 | Pownall | |
| 4,213,688 A * | 7/1980 | Mikajiri | 396/250 |
| 4,862,257 A | 8/1989 | Ulich | |
| 5,365,084 A | 11/1994 | Cochran et al. | |
| 5,412,200 A | 5/1995 | Rhoads | |
| 5,647,368 A | 7/1997 | Zeng et al. | |
| 5,880,777 A * | 3/1999 | Savoye et al. | 348/217.1 |
| 6,046,431 A | 4/2000 | Beattie | |
| 6,082,858 A | 7/2000 | Grace et al. | |
| 6,713,264 B2 | 3/2004 | Luttermann et al. | |
| 6,993,167 B1 * | 1/2006 | Skladnev et al. | 382/128 |
| 2002/0071594 A1 * | 6/2002 | Kool et al. | 382/103 |

FOREIGN PATENT DOCUMENTS

| | | |
|---|---|---|
| DE | 40 15 861 | 11/1991 |
| DE | 44 08 072 | 8/1995 |
| DE | 199 21 127 | 11/2000 |
| DE | 199 52 240 | 5/2001 |

OTHER PUBLICATIONS

"Cordin Products, Electronic Imaging Systems", Anonymous, Internet Article, Online! XP002241090.
Dhillon, V. et al, "ULTRACAM—studying astrophysics on the fastest timescales", New Astronomy Reviews 45 (2001), Elsevier Science, B.V., pp. 91-95.

* cited by examiner

*Primary Examiner* — Jamie Atala
(74) *Attorney, Agent, or Firm* — Walter Ottesen

(57) ABSTRACT

An optical image recordation and image evaluation system has an imaging beam path and at least two digital cameras and a beam splitter. The beam splitter splits the light of the imaging beam path and conducts the same to respective digital cameras. The start time points for image recordation by the digital cameras are synchronized with respect to each other and the beam splitter is a dichroic beam splitter. The synchronization of the start time points preferably has an accuracy which is equal to or less than 1/1000th of the shortest exposure time of the digital cameras so that simultaneous images are recorded in different spectral ranges.

10 Claims, 1 Drawing Sheet

OPTICAL IMAGE RECORDING AND IMAGE EVALUATION SYSTEM

CROSS REFERENCE TO RELATED APPLICATION

This application is a continuation application of international patent application PCT/EP 03/01702, filed Feb. 20, 2003, and claiming priority from German application 102 10 831.5, filed Mar. 12, 2002, the entire content of which is incorporated herein by reference.

FIELD OF THE INVENTION

The invention relates to an optical image recording and image evaluation system having an imaging beam path and at least two digital cameras and a beam splitter. The beam splitter splits the light of the imaging beam path and conducts the same to the two digital cameras.

BACKGROUND OF THE INVENTION

A system of this kind is offered by the Cordin Company under the product designation 220-8. The system contains overall eight digital cameras. The adjustments of the individual digital cameras, for example, the exposure times of each of the cameras, can be adjusted independently of each other. The system functions to record image series at high speed. Accordingly, the image recordation of the different cameras is started sequentially in time so that the desired image series arises via the totality of the individual images recorded sequentially with different cameras. A use in the fluorescence analysis is not provided.

In the fluorescence analysis and in the fluorescence microscopy, applications are known which, up to now, can only be carried out with laser scan microscopes. Examples for this are emission ratio measurements and co-localization of particles. Laser scan microscopes have, however, the disadvantage that they are, on the one hand, technically very complex and, on the other hand, have relatively long recording times for the recording of large image fields. These long recording images can be up to several seconds. For very rapid diffusion occurrences, these recording times can be too long in order to adequately interpret detected differences. Examples for a laser scan microscope and fluorescence analyses executable therewith are described, for example, in the brochure entitled "Axiovert 200" of Carl Zeiss AG having the publication number 40-085d/01.01.

SUMMARY OF THE INVENTION

It is an object of the invention to provide an optical image recording and image evaluation system wherein fluorescence applications can be carried out also with conventional microscopic or macroscopic systems simultaneously transmitting entire image fields. These fluorescence applications were up to now only possible with laser scan microscopes.

The optical image recording and image evaluation system of the invention includes an imaging beam path, at least two digital cameras and a beam splitter, which splits the light of the imaging beam path into components and leads the same to the digital cameras, respectively. The start time points of the image recordation of the digital cameras are synchronized to each other so that the starting time points for the exposures of the digital cameras are identical in the context of synchronization accuracy. The beam splitter is configured as a dichroic beam splitter so that the digital cameras detect light of different spectral ranges.

The digital cameras should simultaneously record two-dimensional fields and, correspondingly, exhibit respective two-dimensional arrangements of light sensitive pixels or have a two-dimensional sensor chip configured otherwise.

The synchronization of the start time points of the exposures of the cameras should take place with a synchronization accuracy which is equal to or less than $1/1000$th of the shortest exposure time of the digital cameras. In this way, it is achieved that the start of the image recordation of all cameras is simultaneous relative to the exposure times of all cameras so that the recorded images correspond to simultaneously recorded images.

A trigger device is provided for the synchronization of the individual cameras. Furthermore, the line lengths between the trigger device and the digital cameras should be identical up to less than 10% of the longest of the line lengths. For more than two digital cameras, which are to record images simultaneously, the line lengths should also be identical up to 10% of the longest of the line lengths. With this measure, no different unknown delays occur on the signal paths between the trigger device and the cameras.

The beam splitter is configured as a dichroic beam splitter. For this reason, the different cameras detect exclusively light in different spectral bands and, as a consequence, the images, which are recorded with different cameras, reproduce the spatial distribution of different fluorescent compounds or fluorescent colorants. Furthermore, and notwithstanding the requirement of recording image information at different wavelengths, monochrome cameras with high pixel density and therefore high digital resolution can be used. Alternatively, one or several color cameras can be used in order to achieve a color separation within the spectral ranges already separated by the dichroic color splitter. With the additionally obtained color information, the color shift based on biological or chemical processes can be detected and can also be shown as emission ratio.

Insofar as more than two mutually synchronized cameras are provided, also several dichroic beam splitters have to be provided having different separation edges.

For the excitation of fluorescences, a suitable illuminating device should be provided. For an incident illumination, an additional dichroic beam splitter should be provided for separating the measurement light from the excitation light.

The optical image recordation and image evaluation system according to the invention can be configured as a macroscopic or microscopic magnification system. Here, the configuration as a microscopic system having a magnifying imaging optical system is preferred. Furthermore, especially the configuration as an ancillary module for a microscope is preferred, for example, in the form of a module which can be placed in the photo beam path of a microscope.

For adjusting the individual digital cameras relative to each other so that both or all cameras cover the same image region, one of the digital cameras should be adjustable to the optical axis of the component beam path which is conducted thereto. For more than two digital cameras, all except one digital camera should be adjustable to the optical axis of the component beam path leading thereto.

The optical image recordation and image evaluation system has an image evaluation unit for combining the images recorded with the different digital cameras. This image evaluation system can be configured as a personal computer having a suitable evaluation software. The image evaluation unit should make possible the formation of quotient images, that is, images whose brightness value and/or color value at a location correspond to the quotient of the brightness values at the same location of component images which were recorded with different cameras. The formation of quotients at different locations is also purposeful, for example, in order to analyze diffusion processes in the recorded object.

Furthermore, a control unit for recording and storing image series of simultaneously recorded images should be provided. In this way, series of images, which were recorded simultaneously at different wavelengths, can be observed online. For a sufficiently rapid image processing, quotient images of large image fields can also be observed online. If the image series are stored, then the final evaluation can take place subsequently based on image pairs recorded simultaneously for each case.

The recording parameters especially, for example, the exposure times, and if needed, the sensitivities of the digital cameras can be so adjusted preferably independently of each other so that the recordation conditions at different extinctions are adaptable in different spectral ranges. If the cameras have different exposure times, then the image repetition rate is determined by the exposure time of the digital camera having the longest exposure time so that the simultaneity of the individual exposures is retained. Correspondingly, the control unit is so designed that all digital cameras operate at identical image repetition rates, that is, the image repetition rate is coupled to the longest exposure time.

BRIEF DESCRIPTION OF THE DRAWING

The invention will now be described with reference to the single FIGURE (FIG. 1) of the drawing showing the invention schematically in combination with a microscope.

Figure 1:
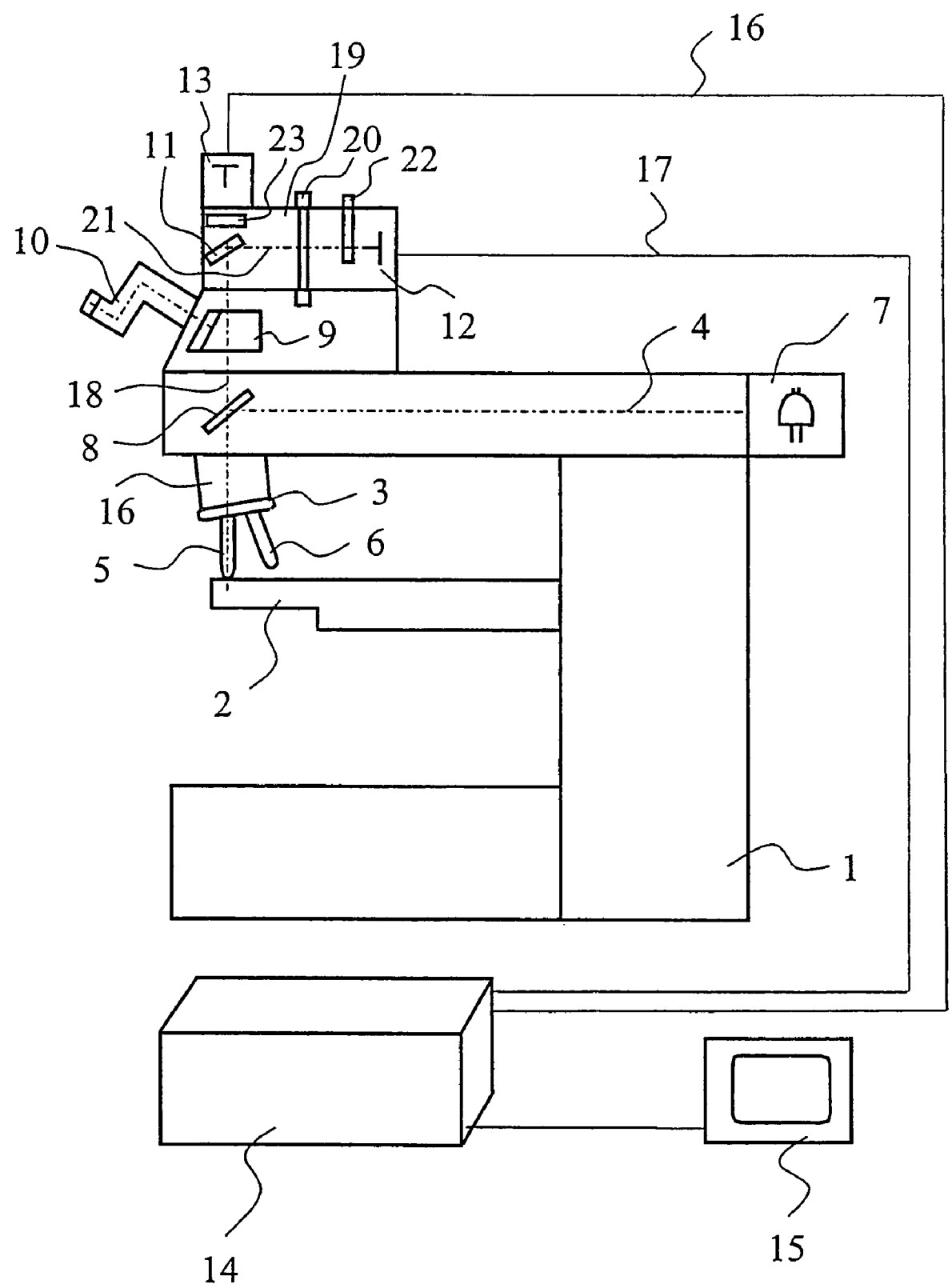

DESCRIPTION OF THE PREFERRED
EMBODIMENTS OF THE INVENTION

The microscope includes, in the usual manner, a stand 1 on which the object table 2 is accommodated and adjustable in elevation. In addition, an objective turret 3 for holding several objectives (5, 6) is accommodated on the stand 1 above the object table 2.

An illuminating device 7 is accommodated on the rear end of the microscope stand. The illuminating device 7 functions to illuminate a specimen in incident light. The specimen is accommodated on the object table 2. The light of the incident illumination device 7 is deflected along the incident illumination beam path 4 by a mirror 8 in a direction toward the objective 5. The mirror 8 is mounted above the objective turret 3 and the objective 5 is switched into the beam path. The mirror 8 is configured as a dichroic beam splitter in order to separate the light, which comes from the incident illumination 7, and the fluorescence light, which is emitted by the specimen, from each other.

At first, the viewing beam path 18 runs in a vertical direction above the mirror 8. A component of the viewing beam path is reflected out by a beam splitter prism 9 in the direction toward the ocular tube 10.

The component of the viewing beam path, which is not reflected out by the beam splitter prism 9, continues to run in the vertical direction into a camera tube 19 having two outputs. A further dichroic beam splitter 11 is accommodated in the camera tube 19. The beam splitter 11 splits the light of the viewing beam path to the two outlets of the camera tube in dependence upon wavelength.

Digital cameras (12, 13) are connected to corresponding ones of the outlets of the camera tube 19. Each of the two digital cameras (12, 13) has a two-dimensional sensor chip and thereby simultaneously records a two-dimensional image field. Both cameras are synchronized with each other via a synchronization unit. The synchronization unit is configured as a personal computer 14. A precise synchronization here means the simultaneity of the start of the exposure and image recordation with two cameras. In order to ensure this adequately precise synchronization, the line connections (16, 17) between the personal computer 14 and the two cameras are identical except for less than 10% of the longer of the two line connections (16, 17). In this way, it is ensured that the remaining time difference between the start of the image recordation with the two cameras lies in the range of 50 ns to 100 ns. The exposure times of the digital cameras above 0.1 ms then ensure that the synchronization accuracy is less than $\frac{1}{1000}$th of the exposure time.

The personal computer simultaneously also evaluates the images, which are recorded by the two cameras (12, 13), and displays the images, which are generated synthetically from two or more simultaneously recorded images, on the monitor 15.

In order to ensure that the images, which are recorded by the two cameras (12, 13), are not only coincident in time but also spatially, one of the cameras 12 is adjustable with sub-pixel accuracy via an adjusting device 20 perpendicular to the optical axis 21 of the component of the viewing beam path which is guided to the camera 12. In this way, it is achieved that the image fields, which are covered by the two cameras (12, 13), are coincident with subpixel accuracy. A corresponding tube is, for example, known from the double video adapter of Carl Zeiss AG described in the brochure referred to initially herein.

Slides (22, 23) for pivoting in needed color filters are provided between the dichroic beam splitter 11 and the respective cameras (12, 13). In this way, the already apportioned spectral ranges can be still further narrowed in advance of detection.

The system described above can, for example, function for Ca measurement via an emission ratio such as Indo 1 and Indo 2. The fluorescence excitation takes place at a wavelength of 340 nm and the detection takes place at 360 and 380 nm. The dichroic beam splitter 8 for dividing the illuminating beam path and the viewing beam path has a separation edge at a wavelength of approximately 350 nm and the beam splitter 11 has a separation edge at a wavelength of 370 nm for splitting between the two cameras (12, 13). Thereafter, in the image evaluation, the quotient of the brightness images of both cameras (12, 13) are formed at each location of the recorded images and, from this, an image of the Ca concentration is generated as a function of the location. Since both images are recorded simultaneously, it is ensured that the quotient of the fluorescence intensities actually corresponds to the concentration and is not determined by other processes.

A further application is FRET, a further emission ratio, which, however, is based on a single colorant, for example, chameleon. However, the excitation here takes place at a wavelength of 480 nm and the fluorescence detection takes place at 520 and 580 nm. Correspondingly, the separation edges of the dichroic beam splitters (8, 11) are to be selected so that a first camera detects only the fluorescence at a wavelength of 520 nm and the second camera detects the fluorescence only at 580 nm. The extinctions of the fluorescences for the two emission wavelengths are very different. For this reason, and for this application, the adjustments of the two cameras (especially the exposure times) should be selectable independently of each other.

A further application is co-localization. In this application, it is important whether two proteins (which, for example, are marked differently with FITC and Cy3) are located at the same position or not. Diffusion processes can be detected because of the simultaneity of the image recordations at different wavelengths. In this application too, the extinctions of the fluorescences at the different emission wavelengths are, as a rule, very different. For this reason, the adjustments of the two cameras should also be selectable independently of each other for this application.

A further advantageous application results when one of the two cameras is a color camera (for example, the color camera Axiocam Color of Carl Zeiss AG) and the other camera is a monochrome camera (for example, the camera Axiocam Mono of Carl Zeiss AG). With a microscope, which has an incident illumination for the fluorescence excitation and a transillumination for an imaging in differential interference contrast as most conventional microscopes, then, for example, fluorescence and infrared differential interference contrast can be visualized simultaneously.

Furthermore, it is possible to provide a broadband light source having a downstream monochromator for selecting a suitable excitation wavelength. In this way, the high flexibility is utilized which is possible with the system of the invention. Corresponding monochromators can, for example, be exchangeable fluorescence excitation filters which can be pivoted in or exchanged.

The image evaluation unit can also be configured for recording so-called mosaic images wherein several individual images are subsequently computer assembled to a large total image in order to generate overview images. Correspondingly, the object table is then to be configured as a motor-driven scanning table. With the simultaneous image recordations of the individual images in separate spectral ranges, sum images, difference images and quotient images can be displayed as mosaic overview images.

Compared to laser scan microscopes, the system of the invention affords the advantage that, with each image recordation, a large image field can simultaneously be recorded which, for example, can include 1000×1000 pixels, or, when utilizing high-resolution digital cameras, 3900×3900 pixels. Furthermore, the system is significantly more flexible because one is not tied to special laser lines for fluorescence excitation; instead, the spectral range, which is favorable for the particular application, can be filtered out from a broadband light source.

In FIG. 1, the invention is shown by way of example in the context of an upright microscope. The invention, however, is also applicable in combination with an inverse microscope.

It is understood that the foregoing description is that of the preferred embodiments of the invention and that various changes and modifications may be made thereto without departing from the spirit and scope of the invention as defined in the appended claims.

What is claimed is:

1. A microscope optical image recording and image evaluation system defining an imaging beam path, the system comprising:

an illuminating unit for supplying light to illuminate a specimen disposed in said imaging beam path;

at least two digital cameras;

a dichroic beam splitter for splitting the light of said imaging beam path into first and second component beam paths and directing said first and second component beam paths to corresponding ones of said digital cameras;

a control unit for recording and storing image series of simultaneously recorded image pairs of said specimen;

said control unit including a synchronization device for synchronizing the start time points of the image recording of both of said digital cameras to each other so that the start time points of the exposures of said digital cameras are identical within the bounds of the synchronization accuracy;

said digital cameras having exposure times which can be set to be different from each other;

said synchronization device being adapted to set said start time points of said digital cameras so as to cause said start time points of said exposures of each of the simultaneously recorded image pairs of said digital cameras to be identical down to deviations less than or equal to $1/1000$ of the shortest exposure time of said digital cameras; and, said digital cameras having respective identical image repetition rates with said image repetition rates being determined by that one of said digital cameras which has the longest of said exposure times.

2. The system of claim 1, wherein said synchronization device comprises a triggering unit.

3. The system of claim 2, wherein first and second lines extend between said triggering unit and said digital cameras, respectively; and, said lines have respective lengths with one of said lengths not being more than 10% shorter than the longer one of said lengths.

4. The system of claim 3, wherein at least one of said digital cameras is a high-resolution monochrome camera.

5. The system of claim 1, wherein one of said digital cameras is adjustable perpendicularly to the optical axis of the component beam path leading to said one digital camera.

6. The system of claim 1, further comprising an image evaluation unit for combining the images recorded with said digital cameras.

7. The system of claim 6, wherein said image evaluation unit forms quotient images.

8. The system of claim 1, wherein the exposure time of each of said digital cameras is adjustable so as to cause each of said digital cameras to record an image having optimal image brightness.

9. The system of claim 1, wherein said exposure times of said cameras can be adjusted independently of each other.

10. The system of claim 1, wherein said digital cameras have respective sensitivities; and, said exposure times and said sensitivities of said digital cameras can be so adjusted independently of each other so that recording conditions at different extinctions are adaptable in different spectral regions.

* * * * *